US010783685B2

(12) United States Patent
Fang et al.

(10) Patent No.: US 10,783,685 B2
(45) Date of Patent: Sep. 22, 2020

(54) BANNER IMAGE GENERATION

(71) Applicant: Shanghai Bilibili Technology Co., Ltd., Shanghai (CN)

(72) Inventors: Qing Fang, Shanghai (CN); Shuai Shao, Shanghai (CN); Wenjin Li, Shanghai (CN)

(73) Assignee: Shanghai Bilibili Technology Co., Ltd., Shanghai (CN)

( * ) Notice: Subject to any disclaimer, the term of this patent is extended or adjusted under 35 U.S.C. 154(b) by 0 days.

(21) Appl. No.: 16/447,669

(22) Filed: Jun. 20, 2019

(65) Prior Publication Data

US 2019/0392621 A1  Dec. 26, 2019

(30) Foreign Application Priority Data

Jun. 22, 2018  (CN) .......................... 2018 1 0648552

(51) Int. Cl.
  *G06T 11/60* (2006.01)
  *G06F 3/0484* (2013.01)
  *G06F 3/0486* (2013.01)
  *G06T 11/00* (2006.01)

(52) U.S. Cl.
  CPC ............ *G06T 11/60* (2013.01); *G06F 3/0486* (2013.01); *G06F 3/04845* (2013.01); *G06F 3/04847* (2013.01); *G06T 11/001* (2013.01)

(58) Field of Classification Search
  CPC combination set(s) only.
  See application file for complete search history.

(56) References Cited

U.S. PATENT DOCUMENTS

| 6,023,714 A * | 2/2000 | Hill ....................... G06F 40/103 |
| | | 715/235 |
| 8,335,675 B1 * | 12/2012 | DiVerdi ................... G06T 13/80 |
| | | 434/81 |
| 8,806,331 B2 * | 8/2014 | Grosz ....................... G06F 3/14 |
| | | 715/243 |
| 10,552,016 B2 * | 2/2020 | Cherna ................... G06T 11/60 |

(Continued)

FOREIGN PATENT DOCUMENTS

| CN | 101651550 A | 2/2010 |
| CN | 101814251 A | 8/2010 |

(Continued)

OTHER PUBLICATIONS

Xiezhu et al.; "Prepress Technology"; Printing Industry Press; 2006; 13 pages; contains English Translation.

*Primary Examiner* — Motilewa Good Johnson
(74) *Attorney, Agent, or Firm* — BakerHostetler

(57) ABSTRACT

Techniques for fast generating a banner image are described herein. The disclosed techniques include selecting a size and a layout of the banner image and selecting a stock photo; generating a background canvas according to the size of the banner image; determining an initial size of the stock photo on the background canvas based at least in part on the size and the layout of the banner image; determining an adjusted size of the stock photo on the background canvas on a basis of the initial size using interpolation calculation; determining a position of the stock photo on the background canvas based at least in part on a drag operation; and generating the banner image that includes the background canvas and the stock photo.

20 Claims, 7 Drawing Sheets

(56) References Cited

U.S. PATENT DOCUMENTS

| | | | |
|---|---|---|---|
| 2002/0103704 A1* | 8/2002 | Amano | G06Q 30/0269 |
| | | | 705/14.66 |
| 2006/0129933 A1* | 6/2006 | Land | G06F 3/0481 |
| | | | 715/723 |
| 2009/0080801 A1* | 3/2009 | Hatfield | G06T 11/60 |
| | | | 382/283 |
| 2009/0295789 A1* | 12/2009 | Yao | H04N 1/0044 |
| | | | 345/418 |
| 2011/0185297 A1* | 7/2011 | Reid | G06F 3/04845 |
| | | | 715/765 |
| 2012/0257842 A1* | 10/2012 | Tian | G06K 9/3233 |
| | | | 382/294 |
| 2012/0284610 A1* | 11/2012 | Masuko | G06F 16/972 |
| | | | 715/234 |
| 2016/0292749 A1 | 10/2016 | Beach | |
| 2018/0365813 A1* | 12/2018 | Leong | G06T 5/50 |
| 2019/0325626 A1* | 10/2019 | Tao | G06F 40/106 |

FOREIGN PATENT DOCUMENTS

| | | | | |
|---|---|---|---|---|
| CN | 105678581 A | 6/2016 | | |
| CN | 105678584 A | 6/2016 | | |
| CN | 106485534 A | 3/2017 | | |
| WO | WO-2010016892-1 | * | 2/2010 | H04N 21/4312 |

* cited by examiner

Fig. 6

BANNER IMAGE GENERATION

CROSS-REFERENCE TO RELATED APPLICATION

The present application claims priority of Chinese patent application No. 201810648552.1, filed on Jun. 22, 2018. The entire disclosure of the above-identified application is hereby incorporated by reference herein and made a part of this specification.

BACKGROUND

Banner images (banner) are widely used on website interfaces, and can clearly and intuitively deliver information, provide link entries, and so on with specific photos and words. At the same time, because of its fast update speed, it is necessary to adopt a convenient and fast editing tool to achieve fast banner image generation.

The existing network photo editing tools cannot fully support enlarging or reducing photos while maintaining their clarity, and at the same time cannot achieve flexible configurations of photo positions. More importantly, accesses to these network photo editing tools are usually, limited to platforms or networks, and they do not support offline access operations. Thus, the conventional techniques cannot be used conveniently.

BRIEF DESCRIPTION OF THE DRAWINGS

FIG. 6 is a schematic diagram illustrating an example of an interface for fast generating a banner image in accordance with the present disclosure.

DETAILED DESCRIPTION OF ILLUSTRATIVE EMBODIMENTS

One object of the present disclosure is to provide techniques of fast generating a banner image which may be implemented based on a WEB server, which may be used conveniently without depending on a usage environment, and which may ensure image resolution and change a position of a stock photo in the banner image. Since the techniques are based on a WEB browser to edit photos or images, the present disclosure does not depend on a specific usage environment. The present disclosure can implement photo scaling and movement while ensuring photo clarity and fast generate a banner image. The present disclosure has a low application cost, a simple application mode and a wide application range.

Figure 1:
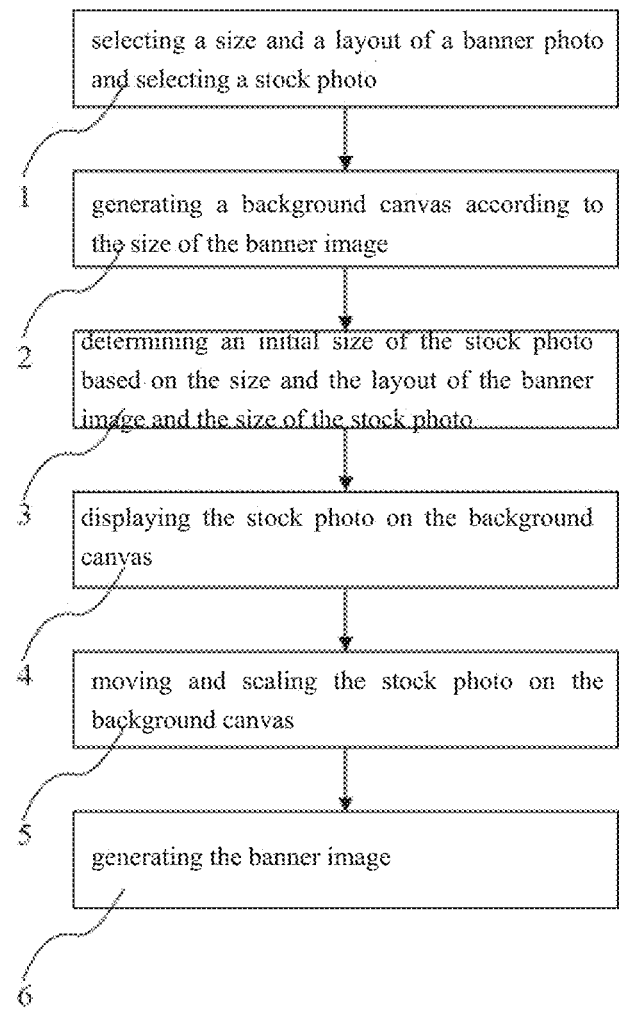
FIG. 1 is a flowchart illustrating an example process of fast generating a banner image in accordance with the present disclosure.

In order to better understand the techniques of the present disclosure, the following embodiments are described in detail. FIG. 1 is a flowchart illustrating an example process of fast generating a banner image in accordance with the present disclosure.

The fast banner image generation method comprises the following steps implemented based on a WEB browser:

(1) selecting the size and the layout of the banner image, and selecting a stock photo; it can also determine the background color of the banner image, edit text, determine the position of the text on the banner image and so on;

(2) generating a background canvas according to the size of the banner image;

(3) determining the initial size of the stock photo according to the size and the layout of the banner image and the size of the stock photo;

(4) displaying the stock photo with the initial size on the background canvas;

(5) adjusting the stock photo;

(6) generating the banner image including the background canvas and the stock photo.

In a preferred embodiment, the layout of the banner image is the proportion of the stock photo with the initial size on the background canvas.

In a further preferred embodiment, the step (3) includes the following steps in detail:

(31) determining the maximum size of the stock photo on the background canvas by the use of the interpolation calculation according to the size and the layout of the banner image;

(32) adjusting the size of the stock photo to the initial size with the interpolation calculation; and making the initial size be not larger than the maximum size.

Specifically, after the layout and the stock photo are selected, in order to achieve the effect of drawing the maximum photo suitable for the layout, it is necessary to compare the length-width ratio of the photo with the length-width ratio of the material part in the selected layout, to determine the scaling benchmark. If the length-width ratio of the photo is larger than the length-width ratio of the material part in the layout, the length of the material part in the layout is taken as the length of the photo drawn on the canvas, on this basis, the width of the photo is scaled proportionally according to the actual proportion of the photo, on the contrary, taking the width of the material part in the layout as the benchmark; the length of the photo is scaled proportionally.

In a further preferred embodiment, the step (5) includes at least one step of the following steps:

(5a) adjusting the size of the stock photo on the basis of the initial size by the use of the interpolation calculation;

(5b) moving the position of the stock photo on the background canvas.

Figure 2:
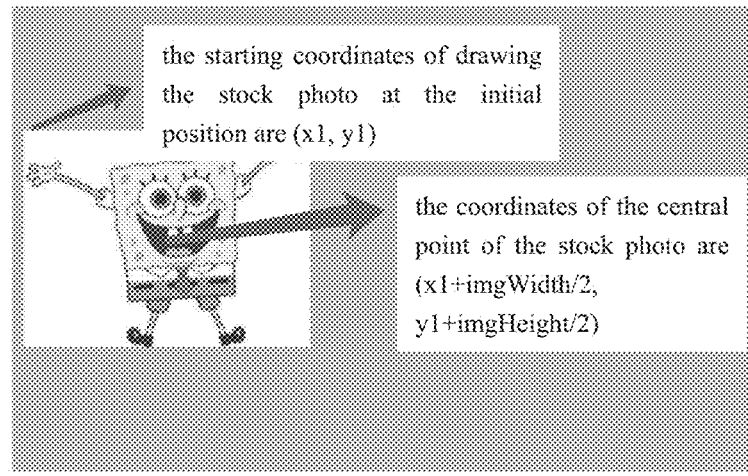
FIG. 2 is a schematic diagram illustrating an example of determining coordinates of a central point of a stock photo at an initial position in a background canvas in accordance with the present disclosure.
Figure 3:
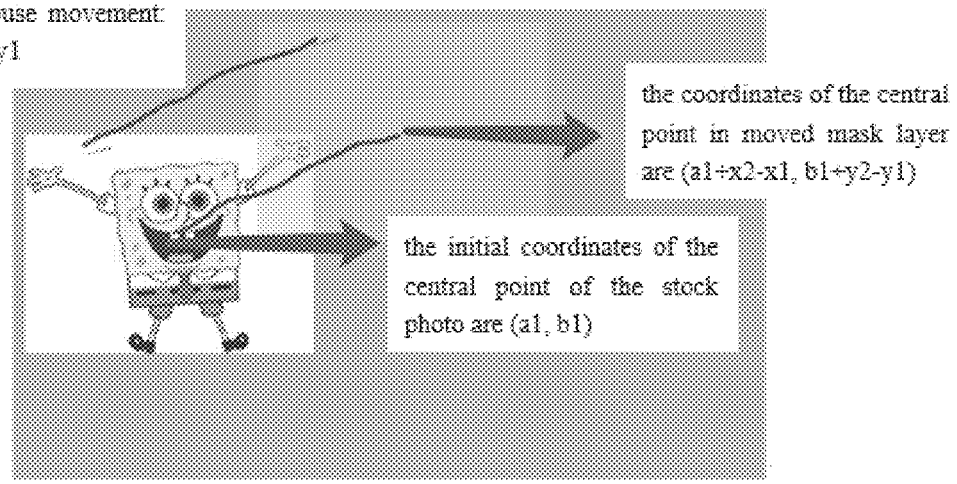
FIG. 3 is a schematic diagram illustrating an example of determining coordinates of a central point of a mask layer of a stock photo at a changed position by a drag operation in accordance with the present disclosure.

The canvas is drawn or cleared with the coordinate of the top left corner of the canvas as the starting point when the canvas is to be drawn and cleared each time, after the initial size is obtained, the starting coordinate of the photo drawing is calculated, and then the coordinate of the central point of the photo drawn initially is calculated. The coordinate of the central point is calculated as shown in FIG. 2, and the relative coordinates of the subsequent operations are calculated on this basis. During the drag process of the photo, the relative values of the coordinates of the mouse between the time that the mouse clicked and the current time are calculated, if the relative values of the abscissa and the ordinate are assumed to be x2−x1 and y2−y1, then the x-axis coordinate of the central point of the mask layer is a2=a1+x2−x1 and the y-axis coordinate of the central point is b2=b1+y2−y1, then the coordinate of the left vertex of the photo is assumed to be (a2+imgWidth/2,b2+imgHeight/2), as shown in FIG. 3.

In a more preferred embodiment, the step (5b) includes the following steps in details:

(5b-1) monitoring the drag operation to the stock photo, and obtaining the starting coordinate of the drag operation at the beginning of the drag operation;

(5b-2) clearing the background canvas; and displaying and tracking the stock photo as a mask layer under the drag operation on the background canvas;

(5b-3) obtaining the ending coordinate when the drag operation is finished by monitoring the drag operation, and hiding the mask layer;

(5b-4) calculating the target coordinate of the stock photo according to the starting coordinate and the ending coordinate of the drag operation and the original coordinate of the stock photo;

(5b-5) redrawing the stock photo on the background canvas according to the target coordinate.

Specifically, the drag operation can be started when a mouse down event in the stock photo area on the canvas is monitored. After the drag operation begins, in order to reduce the actual cost of redrawing the stock photo and clearing the canvas, a method of dragging the mask layer of the stock photo in real-time is adopted. The coordinates and the sizes of the central point of the mask layer are the same as those of the central point of the stock photo. In the mouse moving process, the coordinates of the mask layer are changed and rendered in real time. When a mouse up event is monitored, the mask layer is hidden, and the drag operation is finished, the coordinate of the central point of the stock photo is modified, and the coordinate and the size of the starting point of the drawing are obtained by calling the calculation module. Before drawing, the canvas is cleared according to the coordinate of the left vertex and the size of the photo drawn previously, and then another photo is drawn.

Figure 4:
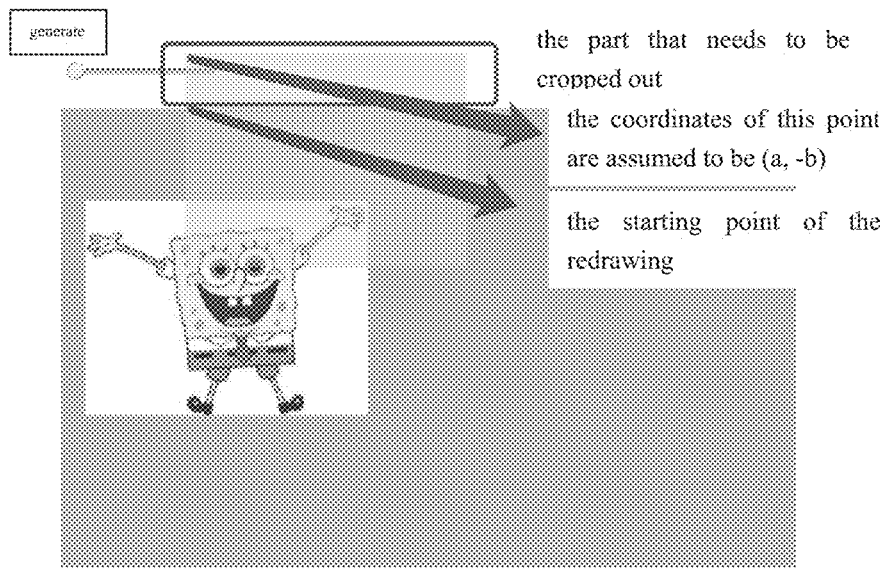
FIG. 4 is a schematic diagram illustrating an example of a part of a mask layer exceeding a boundary of a background canvas in accordance with the present disclosure.

In the scaling and drag processes, it is possible that the out-of-bounds state of the stock photo may occur, as shown in FIG. 4, therefore, when the relative coordinate of the top left vertex is less than zero, the size of the cropped stock photo should be calculated. As shown in the following figure, at this time, the part in the red box is the one beyond the canvas, when the coordinates of the convex of the top left corner of the canvas is taken as the origin of the coordinates, at this time, the value of the y-axis coordinate is negative, so that the part that needs to be cropped out is the part whose width is that of the photo and whose height is that of the part having b pixels from the top left vertex, and when the cropping is finished, the photo needs to be redrawn. Then the starting point of the redrawing is (a, 0), as shown in FIG. 1-3, the width of the redrawing remains unchanged, and the height should be subtracted by b pixels. The photo redrawn is as shown in FIG.

The present invention also provides a fast banner image generation system and a computer-readable storage medium, the system includes a processor and a storage, the storage is the computer-readable storage medium on which a computer program is stored, and the fast banner image generation methods stated in the embodiments mentioned above are implemented when the computer program is executed by the processor.

In the practical applications, the fast banner image generation method of the present invention can be implemented by a system having the following application modules:

1) Initialization setting module: according to the settings provided, the size of the banner image, the stock photo, the layout, the background color and the text of the banner image are selected.

2) Material calculation module: after completing the initial settings, according to the layout and the actual size of the stock photo selected in the settings, the maximum size of the photo that can be drawn actually is calculated after the stock photo is scaled proportionally. And there will have the scaling and drag operations to the stock photo in subsequent operations, after the scaling and drag operations to the stock photo are completed, the position and the actual size of the photo that can be drawn actually on the canvas should be recalculated, so as to be able to support the boundary condition.

3) Drawing module: the drawing module draws the scaled clear stock photo by the use of the interpolation algorithm based on the coordinate and the size obtained by the calculation module, and clears the photo existed previously on the canvas according to the size and the position of the stock photo calculated previously before each redrawing, to prevent the photos from overlapping.

4) drag module: the drag module detects the coordinate of the mask layer of the photo moved by the mouse and obtains the coordinate of the central point of the photo drawn finally.

The specific application process is illustrated by the following embodiments:

Embodiment 1

Figure 6:
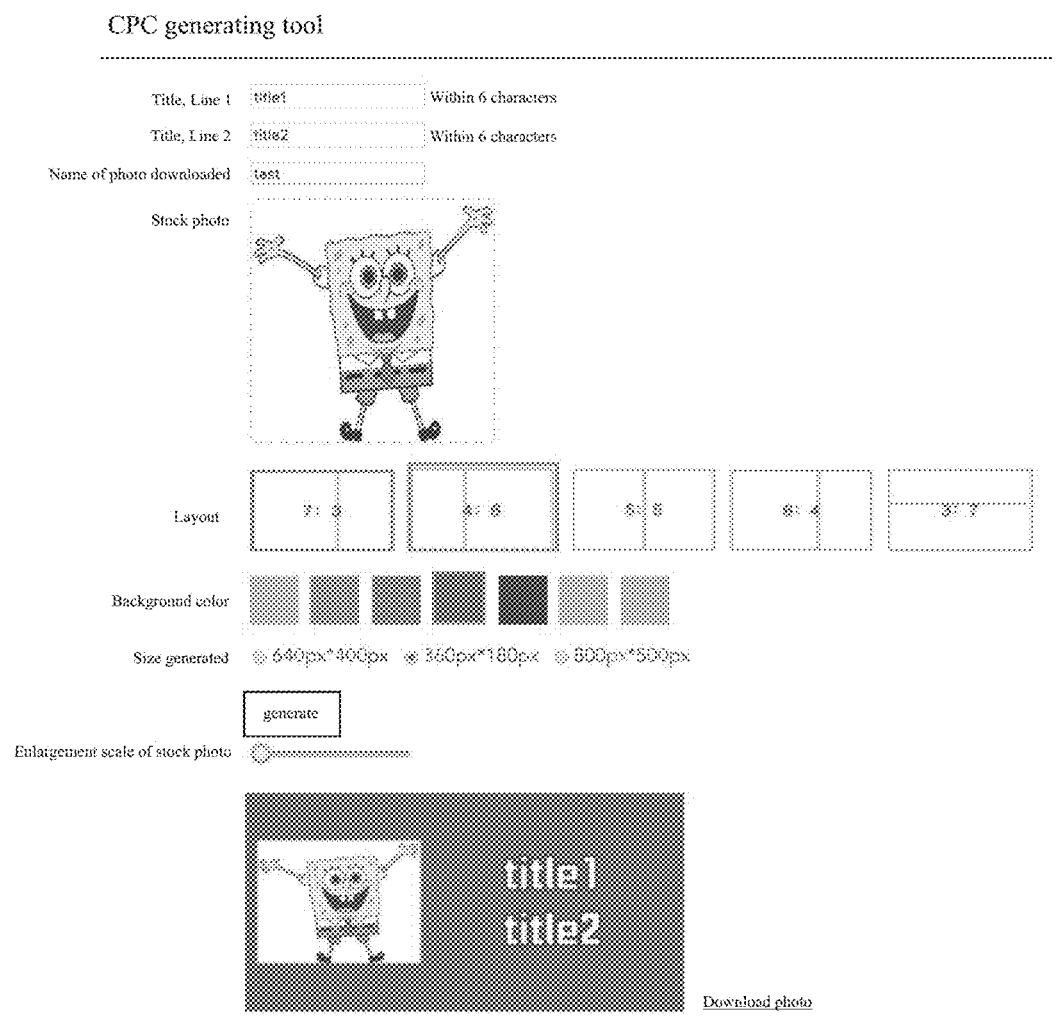

A user opens the interface of the system through a WEB browser, and the interface is as shown in FIG. 6. Firstly, the interface is used to set the title text, select the stock photo, and set the size, the color and the layout of the background canvas. The settings of the layout of the canvas includes 7:3, 6:4, 5:5, 4:6, 3:7 and so on. Its layout determines the proportion of the stock photo in the initial state in the whole background.

After the selections of the contents mentioned above are completed, a preview of the banner image generated according to the settings as mentioned above is given at the lower part of the interface. The user can further use the interface to amend the data mentioned above, and the preview will be amended correspondingly after the confirmation.

Figure 7:
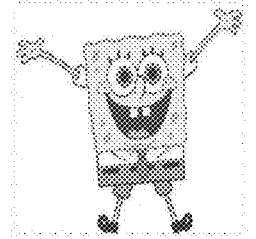
FIG. 7 is a schematic diagram illustrating an example of implementing a drag operation to a stock photo in an interface for fast generating a banner image in accordance with the present disclosure.

As shown in FIG. 7, the user can further select and drag the stock photo on the preview. After clicking on the stock photo, the stock photo in the background disappears, and the effect of the mask layer of the stock photo is displayed. The mask layer follows the drag operation to show the drag position. After the drag operation is finished, the mask layer disappears and the stock photo is redrawn at the position where the drag operation is finished, so that the drag operation of the stock photo can be intuitively completed, so as to adjust conveniently the position of the stock photo.

After the edition as mentioned above is completed, the user can download the banner image.

Embodiment 2

Figure 8:
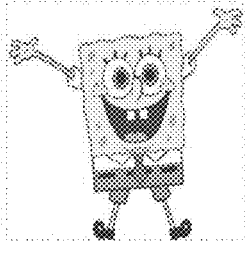
FIG. 8 is a schematic diagram illustrating an example of implementing a scaling operation to a stock photo in an interface for fast generating a banner image in accordance with the present disclosure.

The difference from Embodiment 1 is that, the interface also provides a stock photo zoom bar. After generating the preview of the banner image using the process described in Embodiment 1, as shown in FIG. 8, the user can drag the zoom bar to scale the stock photo. The scaling of the stock photo is achieved based on the interpolation algorithm, which can effectively ensure the photo clarity after scaling. The scaling operation can be used repeatedly by cooperating with the drag operation to ensure the convenience of modifying the stock photo.

Embodiment 3

Figure 5:
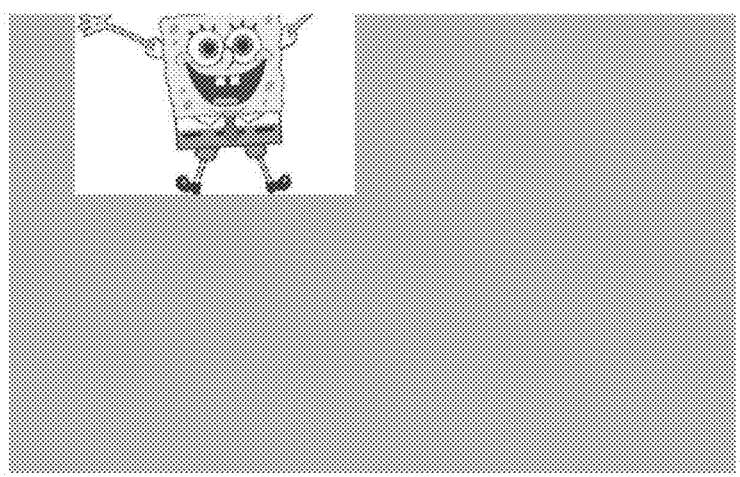
FIG. 5 is a schematic diagram of illustrating an example of a generated stock photo with an out-of-bounds part being removed in accordance with the present disclosure.

The difference from Embodiment 1 and Embodiment 2 is that, whether it is the drag operation or the scaling operation, as shown in FIG. 4, it is possible that the stock photo exceeds the background canvas. At this time, the stock photo can be redrawn according to the position that exceeds the background canvas, and the excess part can be cropped out. The result of the cropping out is as shown in FIG. 5, so as to meet the set canvas size. By this way, the cropping of the stock photo can be realized conveniently.

To sum up, the present invention mainly has four effects: 1. The tool implemented based on the WEB technology can be accessed and used in any browser environment, and can be used by many people at the same time, which improves the convenience of using the tool and reduces the external dependence of using the tool; 2. The tool has a calculated adaptation size for the stock photo, while supporting photo size scaling and maintaining the clarity of the photo; 3. It supports the drag of the photo position, which can flexibly configure the position of the stock photo; 4. The interface is easy to operate and convenient to use.

With the fast banner image generation method, the fast banner image generation system and the computer-readable storage medium of the present invention, in the present method, it is based on a WEB browser to edit the photo, so that the present method does not depend on the specific usage environment, and can realize the photo scaling and the photo position movement on the premise of guaranteeing the photo clarity, to quickly generate the banner image. And the present invention has a low application cost, a simple application mode and a wide application range.

Those skilled in the art will also appreciate that the subject matter described herein may be practiced on or in conjunction with other computer system configurations beyond those described herein, including multiprocessor systems, microprocessor-based or programmable consumer electronics, minicomputers, mainframe computers, handheld computers, personal digital assistants, e-readers, cellular telephone devices, special-purposed hardware devices, network appliances, and the like. The embodiments described herein may also be practiced in distributed computing environments, where tasks are performed by remote processing devices that are linked through a communications network. In a distributed computing environment, program modules may be located in both local and remote memory storage devices.

A network set up by an entity, such as a company or a public sector organization, to provide one or more services (such as various types of cloud-based computing or storage) accessible via the Internet and/or other networks to a distributed set of clients may be termed a provider network. Such a provider network may include numerous data centers hosting various resource pools, such as collections of physical and/or virtualized computer servers, storage devices, networking equipment, and the like, needed to implement and distribute the infrastructure and services offered by the provider network. The resources may in some embodiments be offered to clients in units called instances, such as virtual or physical computing instances or storage instances. A virtual computing instance may, for example, comprise one or more servers with a specified computational capacity (which may be specified by indicating the type and number of CPUs, the main memory size, and so on) and a specified software stack (e.g., a particular version of an operating system, which may in turn run on top of a hypervisor).

A number of different types of computing devices may be used singly or in combination to implement the resources of the provider network in different embodiments, including general-purpose or special-purpose computer servers, storage devices, network devices, and the like. In some embodiments a client or user may be provided direct access to a resource instance, e.g., by giving a user an administrator login and password. In other embodiments, the provider network operator may allow clients to specify execution requirements for specified client applications and schedule execution of the applications on behalf of the client on execution platforms (such as application server instances, Java™ virtual machines (JVMs), general-purpose or special-purpose operating systems, platforms that support various interpreted or compiled programming languages—such as Ruby, Perl, Python, C, C++, and the like—or high-performance computing platforms) suitable for the applications. This may be done without, for example, requiring the client to access an instance or an execution platform directly. A given execution platform may utilize one or more resource instances in some implementations; in other implementations, multiple execution platforms may be mapped to a single resource instance.

Figure 9:
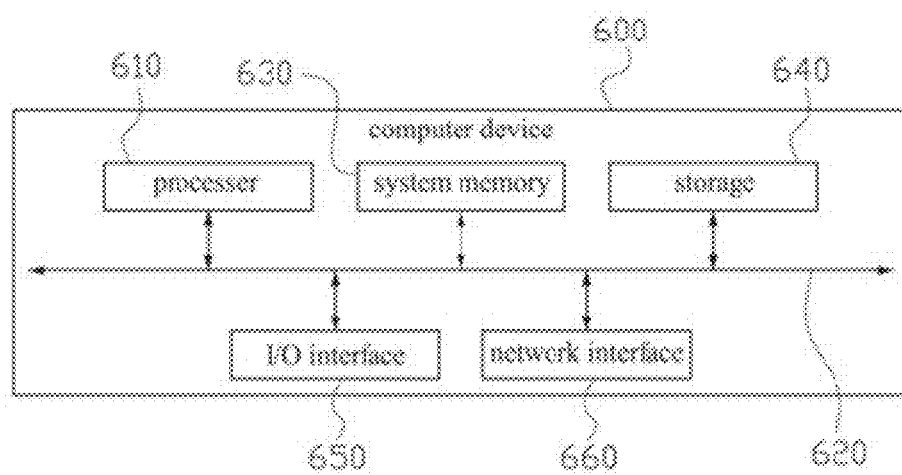
FIG. 9 is a schematic diagram illustrating an example computing device that may be used in accordance with the present disclosure.

In at least some embodiments, a server or computing device that implements a portion or all of one or more of the technologies described herein may include a general-purpose computer system that includes or is configured to access one or more computer-accessible media. FIG. 9 illustrates such a general-purpose computing device 600. In the illustrated embodiment, computing device 600 includes one or more processors 610 (which may be referred herein singularly as "a processor 610" or in the plural as "the processors 610") are coupled through a bus 620 to a system memory 630. Computing device 600 further includes a permanent storage 640, an input/output (I/O) interface 650, and a network interface 660.

In various embodiments, the computing device 600 may be a uniprocessor system including one processor 610 or a multiprocessor system including several processors 610 (e.g., two, four, eight, or another suitable number). Processors 610 may be any suitable processors capable of executing instructions. For example, in various embodiments, processors 610 may be general-purpose or embedded processors implementing any of a variety of instruction set architectures (ISAs), such as the x86, PowerPC, SPARC, or MIPS ISAs, or any other suitable ISA. In multiprocessor systems, each of processors 610 may commonly, but not necessarily, implement the same ISA.

System memory 630 may be configured to store instructions and data accessible by processor(s) 610. In various embodiments, system memory 630 may be implemented using any suitable memory technology, such as static random access memory (SRAM), synchronous dynamic RAM (SDRAM), nonvolatile/Flash-type memory, or any other type of memory.

In one embodiment, I/O interface 650 may be configured to coordinate I/O traffic between processor 610, system memory 630, and any peripheral devices in the device, including network interface 660 or other peripheral interfaces. In some embodiments, I/O interface 650 may perform any necessary protocol, timing, or other data transformations to convert data signals from one component (e.g., system memory 630) into a format suitable for use by another component (e.g., processor 610). In some embodiments, I/O interface 650 may include support for devices attached through various types of peripheral buses, such as a variant of the Peripheral Component Interconnect (PCI) bus standard or the Universal Serial Bus (USB) standard, for example. In some embodiments, the function of I/O interface 650 may be split into two or more separate components, such as a north bridge and a south bridge, for example. Also, in some embodiments some or all of the functionality of I/O interface 650, such as an interface to system memory 630, may be incorporated directly into processor 610.

Network interface 660 may be configured to allow data to be exchanged between computing device 600 and other device or devices attached to a network or network(s). In various embodiments, network interface 660 may support communication via any suitable wired or wireless general data networks, such as types of Ethernet networks, for example. Additionally, network interface 660 may support communication via telecommunications/telephony networks such as analog voice networks or digital fiber communications networks, via storage area networks such as Fibre Channel SANs or via any other suitable type of network and/or protocol.

In some embodiments, system memory 630 may be one embodiment of a computer-accessible medium configured to store program instructions and data as described above for implementing embodiments of the corresponding methods and apparatus. However, in other embodiments, program instructions and/or data may be received, sent or stored upon different types of computer-accessible media. Generally speaking, a computer-accessible medium may include non-transitory storage media or memory media, such as magnetic or optical media, e.g., disk or DVD/CD coupled to computing device 600 via I/O interface 650. A non-transitory computer-accessible storage medium may also include any volatile or non-volatile media, such as RAM (e.g. SDRAM, DDR SDRAM, RDRAM, SRAM, etc.), ROM, etc., that may be included in some embodiments of computing device 600 as system memory 630 or another type of memory.

Further, a computer-accessible medium may include transmission media or signals such as electrical, electromagnetic or digital signals, conveyed via a communication medium such as a network and/or a wireless link; such as may be implemented via network interface 660. Portions or all of multiple computing devices may be used to implement the described functionality in various embodiments; for example, software components running on a variety of different devices and servers may collaborate to provide the functionality. In some embodiments, portions of the described functionality may be implemented using storage devices, network devices, or special-purpose computer systems, in addition to or instead of being implemented using general-purpose computer systems. The term "computing device," as used herein, refers to at least all these types of devices and is not limited to these types of devices.

Each of the processes, methods, and algorithms described in the preceding sections may be embodied in, and fully or partially automated by, code modules executed by one or more computers or computer processors. The code modules may be stored on any type of non-transitory computer-readable medium or computer storage device, such as hard drives, solid state memory, optical disc, and/or the like. The processes and algorithms may be implemented partially or wholly in application-specific circuitry. The results of the disclosed processes and process steps may be stored, persistently or otherwise, in any type of non-transitory computer storage such as, e.g., volatile or non-volatile storage.

The various features and processes described above may be used independently of one another, or may be combined in various ways. All possible combinations and sub-combinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel or in some other manner. Blocks or states may be added to or removed from the disclosed example embodiments. The example systems and components described herein may be configured differently than described. For example, elements may be added to, removed from, or rearranged compared to the disclosed example embodiments.

It will also be appreciated that some or all of the systems and/or modules may be implemented or provided in other ways, such as at least partially in firmware and/or hardware, including, but not limited to, one or more application-specific integrated circuits (ASICs), standard integrated circuits, controllers (e.g., by executing appropriate instructions, and including microcontrollers and/or embedded controllers), field-programmable gate arrays (FPGAs), complex programmable logic devices (CPLDs), etc. Some or all of the modules, systems and data structures may also be stored (e.g., as software instructions or structured data) on a computer-readable medium, such as a hard disk, a memory, a network, or a portable media article to be read by an appropriate drive or via an appropriate connection. The systems, modules, and data structures may also be transmitted as generated data signals (e.g., as part of a carrier wave or other analog or digital propagated signal) on a variety of computer-readable transmission media, including wireless-based and wired/cable-based media, and may take a variety of forms (e.g., as part of a single or multiplexed analog signal, or as multiple discrete digital packets or frames). Such computer program products may also take other forms in other embodiments. Accordingly, the present invention may be practiced with other computer system configurations.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without author input or prompting, whether these features, elements, and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense and not in its exclusive sense) so that when used, for example, to connect a list of elements, the term "or" means one, some, or all of the elements in the list.

While certain example embodiments have been described, these embodiments have been presented by way of example only, and are not intended to limit the scope of the inventions disclosed herein. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions and changes in the form of the methods and systems described herein may be made without departing from the spirit of the inventions disclosed herein. The accompanying claims and their equivalents are intended to cover such forms or modifications as would fall within the scope and spirit of certain of the inventions disclosed herein.

What is claimed is:

1. A method of fast generating a banner image, comprising:
    selecting a size and a layout of the banner image and selecting a stock photo;
    generating a background canvas according to the size of the banner image;
    determining an initial size of the stock photo on the background canvas based at least in part on the size and the layout of the banner image;
    determining an adjusted size of the stock photo on the background canvas on a basis of the initial size using interpolation calculation;
    determining a position of the stock photo on the background canvas based at least in part on a drag operation; and
    generating the banner image that includes the background canvas and the stock photo on the background canvas.

2. The method of claim 1, wherein the layout of the banner image is indicative of a proportion of the stock photo in the banner image.

3. The method of claim 1, wherein the determining an initial size of the stock photo on the background canvas based at least in part on the size and the layout of the banner image further comprises:
    determining a maximum size of the stock photo on the background canvas based at least in part on the size and the layout of the banner image.

4. The method of claim 1, wherein the determining a position of the stock photo on the background canvas based at least in part on a drag operation further comprises:
    monitoring the drag operation on the stock photo; and
    generating a mask layer of the stock photo in response to detecting a start of the drag operation, wherein the mask layer has a same size and a same initial position as the stock photo.

5. The method of claim 4, further comprising:
    obtaining coordinates indicative of a starting position of the drag operation; and
    obtaining coordinates indicative of the same initial position of the mask layer and the stock photo.

6. The method of claim 5, further comprising:
    determining coordinates indicative of changed positions of the mask layer during the drag operation; and
    rendering in real-time the mask layer at the changed positions on the background canvas.

7. The method of claim 6, further comprising:
    obtaining coordinates indicative of an ending position of the drag operation; and
    determining coordinates indicative of an ending position of the mask layer on the background canvas.

8. The method of claim 7, further comprising:
    clearing the background canvas by hiding the mask layer and removing the stock photo at the initial position in response to detecting an end of the drag operation; and
    generating the stock photo on the background canvas based on the coordinates indicative of the ending position of the mask layer.

9. The method of claim 8, further comprising:
    in response to a determination that at least a portion of the generated stock photo exceeds a boundary of the background canvas, removing the at least a portion of the generated stock photo.

10. The method of claim 1, further comprising:
    selecting a background color of the banner image; and
    determining content and position of a text in the banner image.

11. A system of fast generating a banner image, comprising:
    at least one processor; and
    at least one memory communicatively coupled to the at least one processor and storing instructions that upon execution by the at least one processor cause the system to:
    select a size and a layout of the banner image and selecting a stock photo;
    generate a background canvas according to the size of the banner image;
    determine an initial size of the stock photo on the background canvas based at least in part on the size and the layout of the banner image;
    determine an adjusted size of the stock photo on the background canvas on a basis of the initial size using interpolation calculation;
    determine a position of the stock photo on the background canvas based at least in part on a drag operation; and
    generate the banner image, the banner image including the background canvas and the stock photo on the background canvas.

12. The system of claim 11, the at least one memory further storing instructions that upon execution by the at least one processor cause the system to:
    determine a maximum size of the stock photo on the background canvas based at least in part on the size and the layout of the banner image.

13. The system of claim 11, the at least one memory further storing instructions that upon execution by the at least one processor cause the system to:
    monitor the drag operation on the stock photo; and
    generate a mask layer of the stock photo in response to detecting a start of the drag operation, wherein the mask layer has a same size and a same initial position as the stock photo.

14. The system of claim 13, the at least one memory further storing instructions that upon execution by the at least one processor cause the system to:
    determine coordinates indicative of changed positions of the mask layer during the drag operation; and render in real-time the mask layer at the changed positions on the background canvas.

15. The system of claim 14, the at least one memory further storing instructions that upon execution by the at least one processor cause the system to:
   clear the background canvas by hiding the mask layer and removing the stock photo at the initial position in response to detecting an end of the drag operation; and
   generate the stock photo on the background canvas based on coordinates indicative of a position of the mask layer on the background canvas at the end of the drag operation.

16. A non-transitory computer-readable storage medium comprising computer-readable
   instructions that upon execution on a computing device cause the computing device at least to:
   select a size and a layout of the banner image and selecting a stock photo;
   generate a background canvas according to the size of the banner image;
   determining an initial size of the stock photo on the background canvas based at least in part on the size and the layout of the banner image;
   determine an adjusted size of the stock photo on the background canvas on a basis of the initial size using interpolation calculation;
   determine a position of the stock photo on the background canvas based at least in part on a drag operation; and
   generate the banner image, the banner image including the background canvas and the stock photo on the background canvas.

17. The non-transitory computer-readable storage medium of claim 16, further comprising computer-readable instructions that upon execution on the computing device cause the computing device at least to:
   determine a maximum size of the stock photo on the background canvas based at least in part on the size and the layout of the banner image.

18. The non-transitory computer-readable storage medium of claim 16, further comprising computer-readable instructions that upon execution on the computing device cause the computing device at least to:
   monitor the drag operation on the stock photo; and
   generate a mask layer of the stock photo in response to detecting a start of the drag operation, wherein the mask layer has a same size and a same initial position as the stock photo.

19. The non-transitory computer-readable storage medium of claim 18, further comprising computer-readable instructions that upon execution on the computing device cause the computing device at least to:
   determine coordinates indicative of changed positions of the mask layer during the drag operation; and
   render in real-time the mask layer at the changed positions on the background canvas.

20. The non-transitory computer-readable storage medium of claim 19, further comprising computer-readable instructions that upon execution on the computing device cause the computing device at least to:
   clear the background canvas by hiding the mask layer and removing the stock photo at the initial position in response to detecting an end of the drag operation; and
   generate the stock photo on the background canvas based on coordinates indicative of a position of the mask layer on the background canvas at the end of the drag operation.

* * * * *